United States Patent [19]
Noble et al.

[11] Patent Number: 5,914,870
[45] Date of Patent: Jun. 22, 1999

[54] LOW POWER HIGH EFFICIENCY POWER SUPPLY

[75] Inventors: Robert H. Noble, Longmont; Robert B. Smith, Loveland, both of Colo.

[73] Assignee: Hewlett-Packard Company, Palo Alto, Calif.

[21] Appl. No.: 08/993,327

[22] Filed: Dec. 18, 1997

[51] Int. Cl.⁶ .............................. H02M 5/42; G05F 1/10
[52] U.S. Cl. .................................. 363/84; 327/540
[58] Field of Search ................. 363/84, 126, 21, 363/98, 24; 327/540, 541, 538, 536; 323/234

[56] References Cited

U.S. PATENT DOCUMENTS

| | | | |
|---|---|---|---|
| 4,792,764 | 12/1988 | Walker et al. | 327/517 |
| 5,450,305 | 9/1995 | Boys et al. | 363/24 |
| 5,617,015 | 4/1997 | Goder et al. | 323/282 |
| 5,737,207 | 4/1998 | Uratani et al. | 363/132 |

*Primary Examiner*—Peter S. Wong
*Assistant Examiner*—Rajnikant B. Patel

[57] ABSTRACT

A low power high efficiency power supply provides a high voltage level output, which can be used to drive a variety of devices. The power supply uses controlled feedback to a comparator, which in turn drives an AND gate logic device. The comparator drives the AND gate logic device to gate an input clock signal the output of the AND gate logic being supplied to a resonant circuit that is at or near the resonant frequency of the input clock signal. The output of the resonant circuit is rectified to provide the final voltage output. The final voltage output is attenuated and supplied as feedback to the comparator.

18 Claims, 6 Drawing Sheets

LOW POWER HIGH EFFICIENCY POWER SUPPLY

FIELD OF THE INVENTION

The present invention relates generally to power supplies, and more particularly, to a low power, low cost, high efficiency power supply used primarily in hand-held devices as a voltage source used to drive a liquid crystal display (LCD).

BACKGROUND OF THE INVENTION

Many hand-held devices contain multiple components that may require power sources that are capable of providing multiple voltage levels. For example, hand-held measuring equipment may contain processing logic that requires a different voltage level than, for example, a liquid crystal display (LCD) unit. LCDs, which are used in many hand-held device applications including wristwatches, toys and games, and hand-held test and measurement equipment, require a compact, high voltage output (as compared to for example, processing logic) power supply. LCDs offer an efficient way of presenting information to a user and are common in the above mentioned devices.

Modern LCDs offer many features that just a few years ago were unavailable, and as a result, require ever increasing sources of voltage in order to operate. In the past power supplies have employed oscillators, or tank circuits, to provide the voltage levels required to drive LCDs. Other LCD voltage sources use boost regulators or additional windings on special transformers. These sources have fixed outputs that require the use of post regulators to set contrast in the LCD. Unfortunately however, power supplies using these technologies to drive LCDs are expensive and use a large number of parts. Furthermore, as power and processing demands are ever increasing for hand-held devices, battery life for devices containing LCDs continue to drop, thus creating a need in the industry for a new efficient power source that is capable of supplying the high voltage levels demanded by modern LCDs, while minimizing power consumption and component cost.

SUMMARY OF THE INVENTION

The present invention provides an improvement to existing power sources primarily used to drive liquid crystal displays. While the low power high efficiency power supply disclosed herein is described as being applicable to driving LCDs in hand-held test and measuring equipment, the power supply is applicable to any device requiring a low power consumption, low cost, high efficiency power source.

The present invention is a low power, high efficiency power supply comprising a comparator having a first input and a second input. Also included is logic, in the form of an "AND" gate, responsive to the output of the comparator and an input clock signal. The output of the AND gate logic is supplied to a resonant circuit having a resonant frequency, wherein the output of the AND logic is at a frequency equal, or as close as possible, to that of the resonant frequency of the resonant circuit. A rectifier circuit, configured to receive as input the output of the resonant circuit, provides a rectified output in the form of a DC voltage that is used to drive, for example, a liquid crystal display (LCD) in a hand-held measuring device. In a preferred embodiment, the above mentioned comparator has two inputs. A first input is supplied by a DC control voltage, the control voltage being proportional to the desired final voltage output of the power supply. The comparator is responsive, at the second input, to a signal proportional to that of the final voltage output. That is, the rectified output of the rectifier circuit, that being the final voltage output of the power supply, is supplied to additional circuitry, the additional circuitry configured, based upon the desired application, to attenuate the rectified final voltage output signal and supply it to the second input of the comparator as feedback. In alternate embodiments, the power supply is implemented on an application specific integrated circuit (ASIC), whereby, for example, the comparator is implemented as digital logic having a single input. The comparator compares the feedback signal to the control voltage signal and gates the AND gate logic. The frequency of the gated output signal of the AND logic is at, or near, the resonant frequency of the resonant circuit as is the clock signal input to the AND logic.

The present invention can also be conceptualized as providing a method for producing a low power high efficiency voltage source, comprising the following steps. First, a logic gate is supplied with the output of a comparator and a clock signal input. The logic gate, being an AND gate in the preferred embodiment, is switched on and off by the output of the comparator, thus supplying to a resonant circuit, connected to the output of the AND logic, a signal having a frequency that is closely matched to the resonant frequency of the resonant circuit. This is possible because the clock signal input to the comparator is also at or near the resonant frequency of the resonant circuit. The output of the resonant circuit is then supplied to a rectifier circuit, which supplies as output a rectified final voltage signal output. This rectified final voltage signal output is used both as a voltage source to drive, for example, a liquid crystal display, and as feedback to the comparator. When supplied as feedback to the comparator, the rectified final voltage signal output is attenuated by additional circuitry, the attenuation based upon the application, and supplied to a second (or inverting) input to the comparator. In an ASIC implementation, the comparator is implemented using all digital logic having a single input.

The invention has numerous advantages, a few of which are delineated hereafter, merely as examples.

An advantage of the low power high efficiency power supply is that it provides a relatively high voltage level output while consuming minimum power.

Another advantage of the low power high efficiency power supply is that it employs gating logic to modulate an input clock source in order to provide a stable high voltage level output.

Another advantage of the low power high efficiency power supply is that it reduces power consumption by only driving the resonant circuit when necessary to maintain output voltage, and by eliminating the need for voltage regulation after the resonant circuit.

Another advantage of the low power high efficiency power supply is that it extends the battery life of any small hand-held device containing a component that requires a large voltage source.

Another advantage of the low power high efficiency power supply is that it is simple in design, reliable in operation, and its design lends itself to economical mass production in hand-held test and measurement devices.

Another advantage of the low power high efficiency power supply is that it lends itself to implementation on an application specific integrated circuit (ASIC) for economical mass production.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings. The components within the drawings are not necessarily to scale relative to each other, emphasis instead being placed on clearly illustrating the principles of the present invention.

DETAILED DESCRIPTION OF THE PREFERRED EMBODIMENT

The low power high efficiency power supply of the present invention can be implemented using discrete components, or implemented on an application specific integrated circuit (ASIC). Furthermore, while described in the context of residing within a hand-held measuring device, the low power high efficiency power supply can be used in any application requiring a compact high efficiency power supply, for example, but not limited to, a beeper or a portable calculator.

Figure 1:
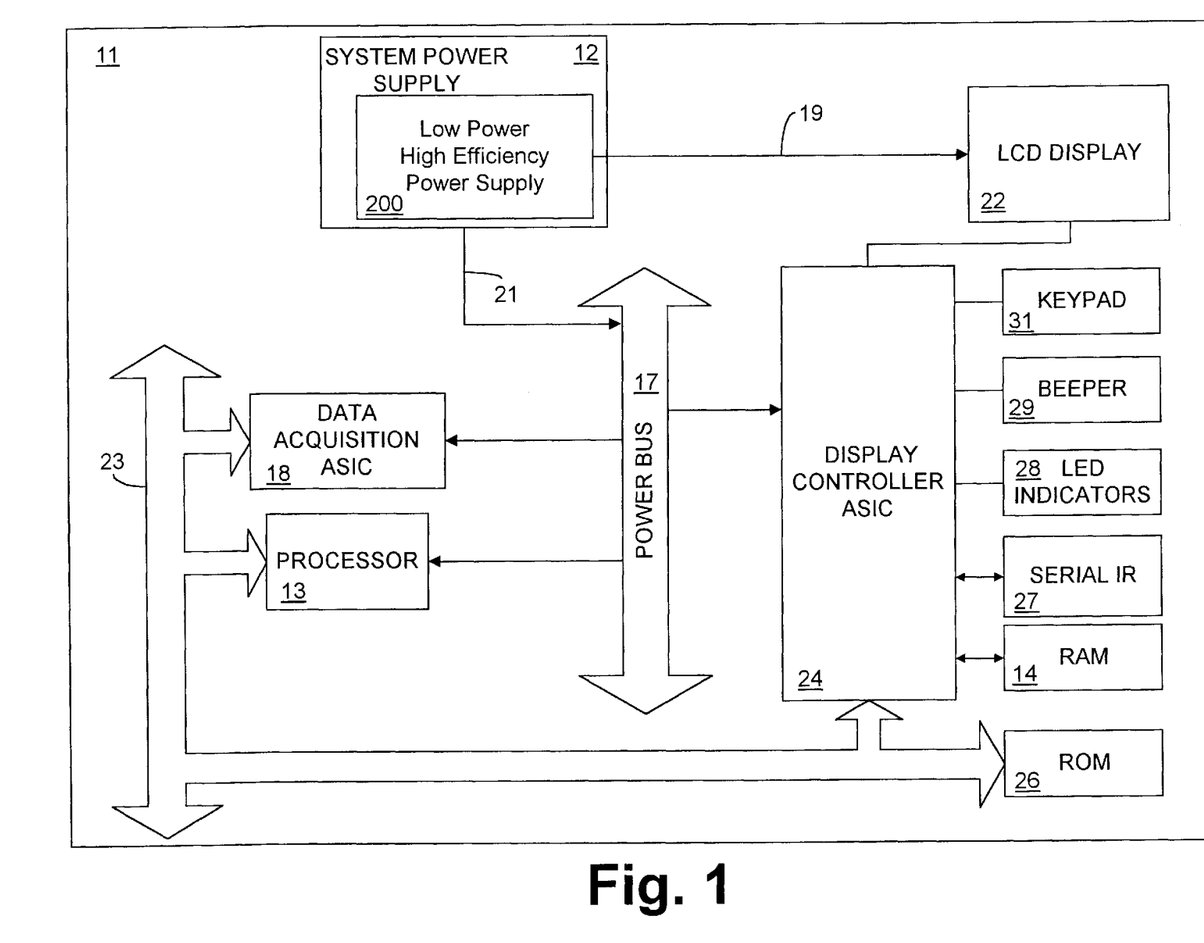
FIG. 1 is a block diagram illustrating a hand-held measuring device containing the low power high efficiency power supply described herein.

Referring now to FIG. 1, shown is a block diagram of a hand-held measuring device 11 containing the low power high efficiency power supply 200 of the present invention. Hand-held measuring device 11 can be for example, a voltmeter, volt-ohm meter, logic probe, or any device containing a liquid crystal display, or other component that demands a voltage level higher than that typically obtainable from battery voltage (i.e., 3 to 9 volts) as input. Measuring device 11 contains components that are known to those skilled in the art of hand-held measuring devices. Measuring device 11 contains, among other items, system power supply 12, which supplies power on line 21 to power bus 17. System power supply 12 supplies the various voltage levels required by the different components of hand-held measuring device 11. Connected to logic bus 23 and power bus 17 are data acquisition application specific integrated circuit (ASIC) 18, processor 13, and read only memory 26. Also contained within hand-held measuring device 11 is display controller ASIC 24. Connected to display controller ASIC 24 are random access memory 14, serial infrared (IR) interface 27, LED indicators 28, beeper 29, and keypad 31. Also connected to display controller logic ASIC is LCD 22. LCD 22 typically requires a variable voltage supply on the order of 8V to 20V or higher. In addition, LCD 22 requires a variable power supply so that contrast level in the LCD can be adjusted. System power supply 12 also contains low power high efficiency power supply 200. Low power, high efficiency power supply 200 is depicted as residing within system power supply 12 because power supply 200 is an additional high voltage output power supply and is used in this application to drive only, on line 19, liquid crystal display 22.

Figure 2:
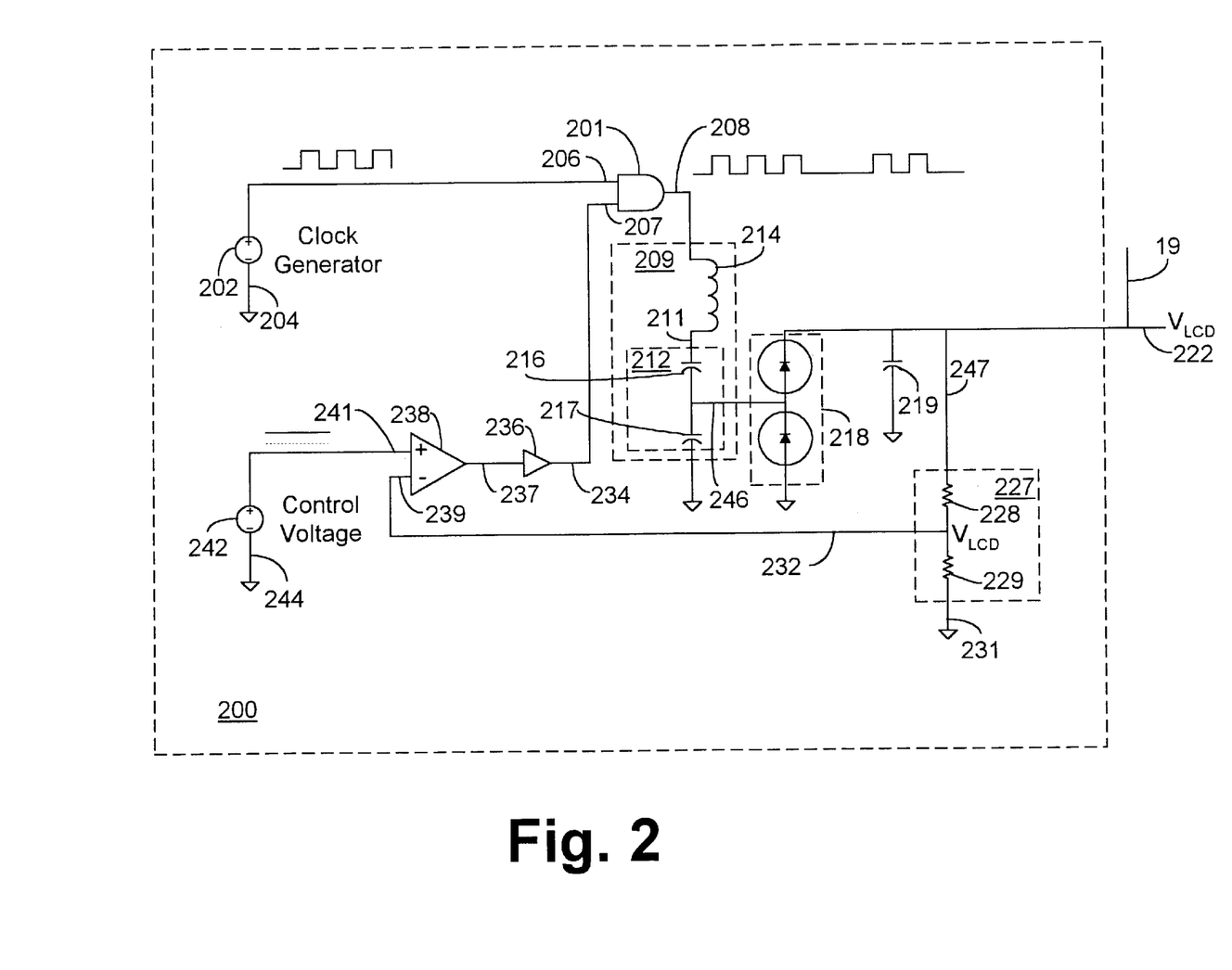
FIG. 2 is a schematic view of the low power high efficiency power supply of FIG. 1.

With reference to FIG. 2, shown is a schematic view, illustrating with discrete components, the low power high efficiency power supply 200 of FIG. 1. An AND gate logic 201 receives as input at terminal 206 the output of clock generator 202. Clock generator 202 supplies a square wave clock signal input to AND gate logic 200 and is connected to system ground on line 204. The output of clock generator 202 is typically provided by an application specific integrated circuit (ASIC). Connected to input 207 of AND gate logic 201 on line 234 is the output of comparator 238, which passes through schmitt trigger 236. The operation of comparator 238 and the feedback signal on line 232 to the inverting input 239 of comparator 238 will be discussed below. Schmitt trigger 236 is well known in the art and functions to provide hysteresis to the input of AND gate logic 201 at terminal 207 in order to avoid chatter at the output of AND gate logic 201. The output of comparator 238 is used to gate, or turn on and off, the clock signal input on line 206 through AND gate logic 201. The output of AND gate logic 201 on line 208 is therefore the clock signal input on line 206 regulated by the output of comparator 238. The output of AND gate logic 201 is the clock signal input to terminal 206 of AND gate logic 201 regulated by the output of comparator 238.

The output of AND gate logic 201 on line 208 is supplied to resonant circuit 209. Resonant circuit 209 is sometimes referred to as a tank circuit. Resonant circuit 209 comprises inductor 214 and split capacitor 212, which in turn comprises capacitors 216 and 217. Resonant circuit 209 has a resonant frequency (determined by the value of inductor 214 and capacitors 216 and 217) that is matched as closely as possible to the frequency of the output of clock generator 202, and input as the input clock signal to terminal 206 of AND gate logic 201. Because the clock signal input is typically provided by an ASIC, it is relatively simple to provide the clock signal at virtually any desired frequency. Typically, a microprocessor clock is available to the ASIC, which can simply divide down the microprocessor clock to a frequency that is closely matched to the resonant frequency of resonant circuit 209. The task then is to specify a set of components for the resonant circuit 209 which result in a resonant frequency coincident with a clock signal that is easily obtained from the microprocessor. For example, a microprocessor clock frequency of 11.059 MHz is divided by 32 to obtain an input clock signal of 345.6 KHz. The combination of components in resonant circuit 209 (inductor 214, capacitors 216 and 217) have a resonant frequency given by $f=1/(2*PI*L*C)$, where $PI=3.14159\ldots$, L=inductance=$68*10^{-6}$ Henry, C=effective capacitance= $(C216*C217)/(C216+C217)=2.87*10^{-9}$ Farad. Inserting these values gives 360.3 KHz, which is close enough to the 345.6 KHz input clock. Resonant circuit 209 can be thought of as a ringing bell having the output of AND gate logic 201 striking resonant circuit 209 at its resonant frequency. Because resonant circuit 209 is excited by the output of AND gate logic 201 at its resonant frequency, the efficiency of power supply 200 is maximized. Split capacitor 212 provides an impedance matching function and also prevents DC coupling back to AND gate logic 201. When the input to AND gate logic 201 on line 234 is low, the output of AND gate logic 201 is at ground.

The output of AND gate logic 201 at node 211 is essentially a large sinusoid. When operated upon by split capacitor 212 the large sinusoid is reduced slightly since capacitor 216 is typically 5 to 10 times larger than capacitor 217. The output of resonant circuit 209 is supplied on line 246 to rectifier circuit 218.

Rectifier circuit 218 operates on the output of resonant circuit 209 to transform, or clip, the energy of the sinusoid at node 211, the energy being captured by capacitor 219, to provide the final rectified output voltage $V_{LCD}$ across capacitor 219. $V_{LCD}$ is supplied to LCD display 22 of FIG. 1 on line 19.

Comparator 238 receives as input to non inverting input 241 a control voltage signal supplied by voltage source 242. The control voltage signal supplied to input 241 by control voltage source 242 is variable, but is typically unchanging within the time scale of clock generator 202 and the comparator cycle, and thus is essentially a DC voltage that is proportional to the desired voltage output $V_{LCD}$ at node 222. The input on line 232 to inverting input 239 of comparator 238 is a feedback voltage signal, which is proportional to final output voltage $V_{LCD}$ on node 222. In order to provide feedback to comparator 238, which typically requires a voltage level input in the range of 0–5 volts (i.e., much smaller than $V_{LCD}$), final output voltage $V_{LCD}$ is attenuated by an additional circuit 227 comprising resistors 228 and 229. Specifically, in this preferred embodiment, the voltage supplied on line 232 to inverting input 239 of comparator 238 is $V_{LCD}*(R229/(R228+R229))$ For example, if the value of resistors 228 and 229 are equal, then the output on line 232 is one half of $V_{LCD}$. If the value of resistor 228 is nine times the value of resistor 229, then the output on line 232 is $1/10$ of $V_{LCD}$. The desired output on line 232 depends upon the system nominal voltage. The values of resistors 228 and 229 are chosen based upon the desired voltage level input to inverting input 239 of comparator 238, the input typically being proportional to $V_{LCD}$. This controlled feedback to comparator 238, which drives the gating provided by AND gate logic 201 to use input clock signal 202 to stimulate resonant circuit 209 enables the power supply to achieve a heretofore unrealized level of high output voltage $V_{LCD}$ with unmatched efficiency. It is important to note that the foregoing description of the operation of the comparator assumes positive voltage signals The power supply can operate with equal effectiveness producing negative voltages. Negative voltage signals would require however, that the orientation of diodes in rectifier circuit 218 be reversed, as well as reversing the inputs to comparator 238 and changing the ground connection on resistor 229 to a positive voltage in order to maintain the voltage level on line 232 within the input voltage range of comparator 238.

Figure 3:
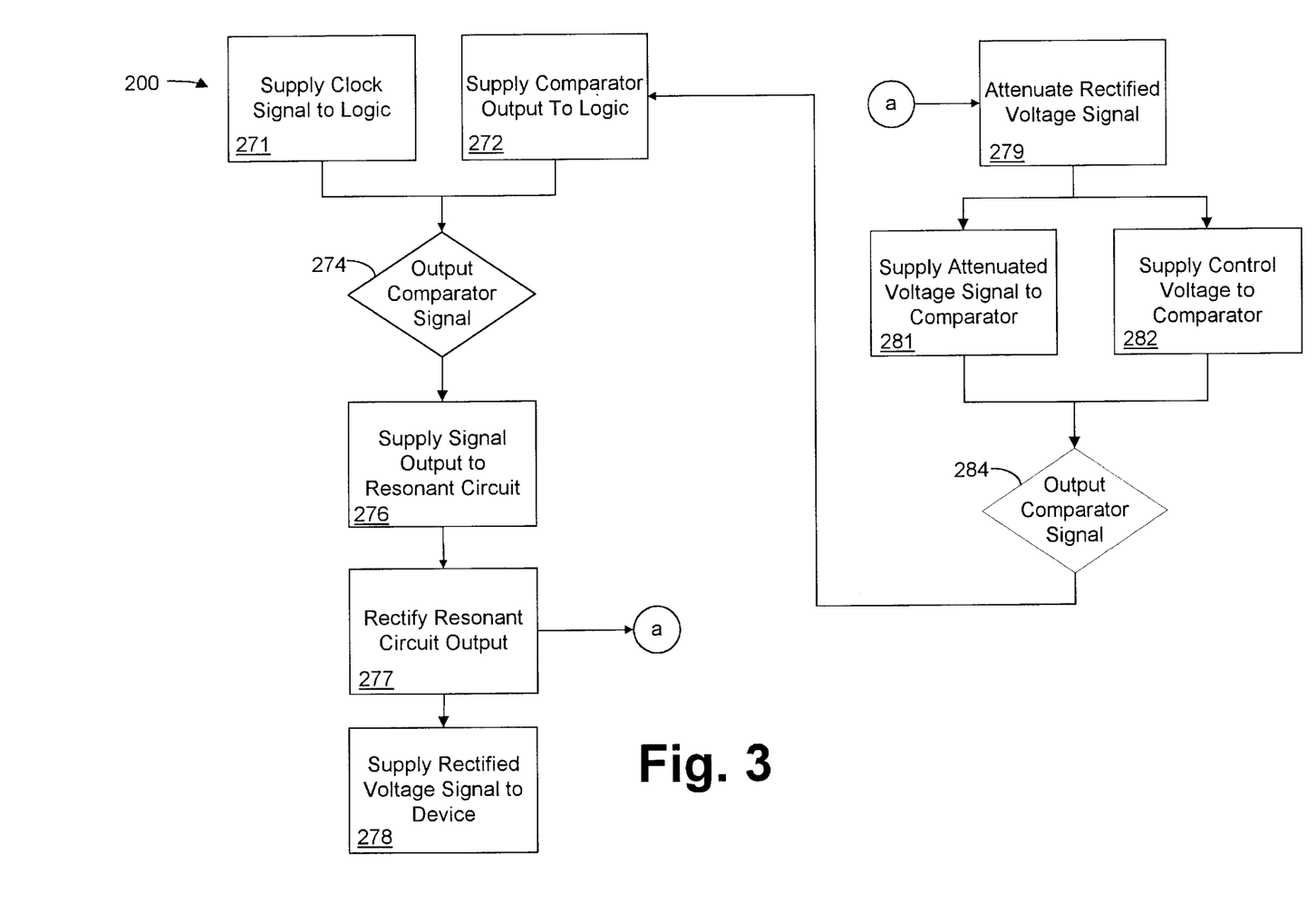
FIG. 3 is a flowchart illustrating the architecture, functionality, and operation of the low power high efficiency power supply of FIG. 2.

Referring now to FIG. 3, shown by way of flowchart is the operation of the low power high efficiency power supply 200 of the present invention.

In block 271 a clock signal is supplied as an input to a first node of an AND gate device. The clock signal is typically supplied from an ASIC. While the preferred embodiment discloses the use of AND gate logic, it is noted that NAND gate logic can be employed with equal effectiveness.

In block 272, to the other input to the AND gate is supplied the output of a voltage comparator, the operation of which will be discussed below. In block 274 the AND gate logic is employed to gate the clock input signal applied to the first input of the AND gate at a rate based upon the output of the comparator circuit applied to the second input of the AND gate.

In block 276 the output of the AND gate is supplied to a resonant circuit. The resonant circuit comprises an inductor and two capacitors arranged in a split capacitor format. The resonant circuit has a predefined resonant frequency The aforementioned clock signal is chosen so that its resonant frequency is at or near the resonant frequency of the resonant circuit. This matching of the resonant frequency of the clock signal to the resonant circuit, together with the gating excitation of the resonant circuit, enables the power supply to be highly efficient.

Next, in block 277, the output signal of the resonant signal is supplied to a rectifier circuit. The rectifier circuit takes the signal output of the resonant circuit, the signal being a large sinusoid, and rectifies the signal to approximate a constant DC output. In block 278 the final output voltage is supplied to a device such as a liquid crystal display. In block 279 the final voltage output is supplied to an attenuation circuit. The attenuation circuit operates on the final output voltage in order to supply a feedback signal to the inverting input of a comparator.

The final output voltage signal is manipulated in accordance with the application. For example, depending on the values of the resistors in the attenuation circuit, the voltage supplied to the inverting input of the comparator can be of a value proportional to that of the final output voltage.

In block 281, the attenuated voltage signal from the attenuation circuit is supplied to the inverting input of the comparator. In block 282 a control voltage signal is supplied to the non inverting input of the comparator. The control voltage can be derived from a digital-to-analog converter typically located in an ASIC, or can be any DC voltage source. The control voltage is of a value that is proportional to that of the desired final output voltage.

In block 284 the comparator signal output is supplied to the AND gate logic described above. The output of the comparator is first supplied to a schmitt trigger device which maintains the output of the comparator at a value which is usable by the AND gate. This comparator output is supplied to the AND gate logic, thus functioning as a source for gating, or turning on and off, the clock signal through the AND gate and supplied to the resonant circuit.

Figure 4:
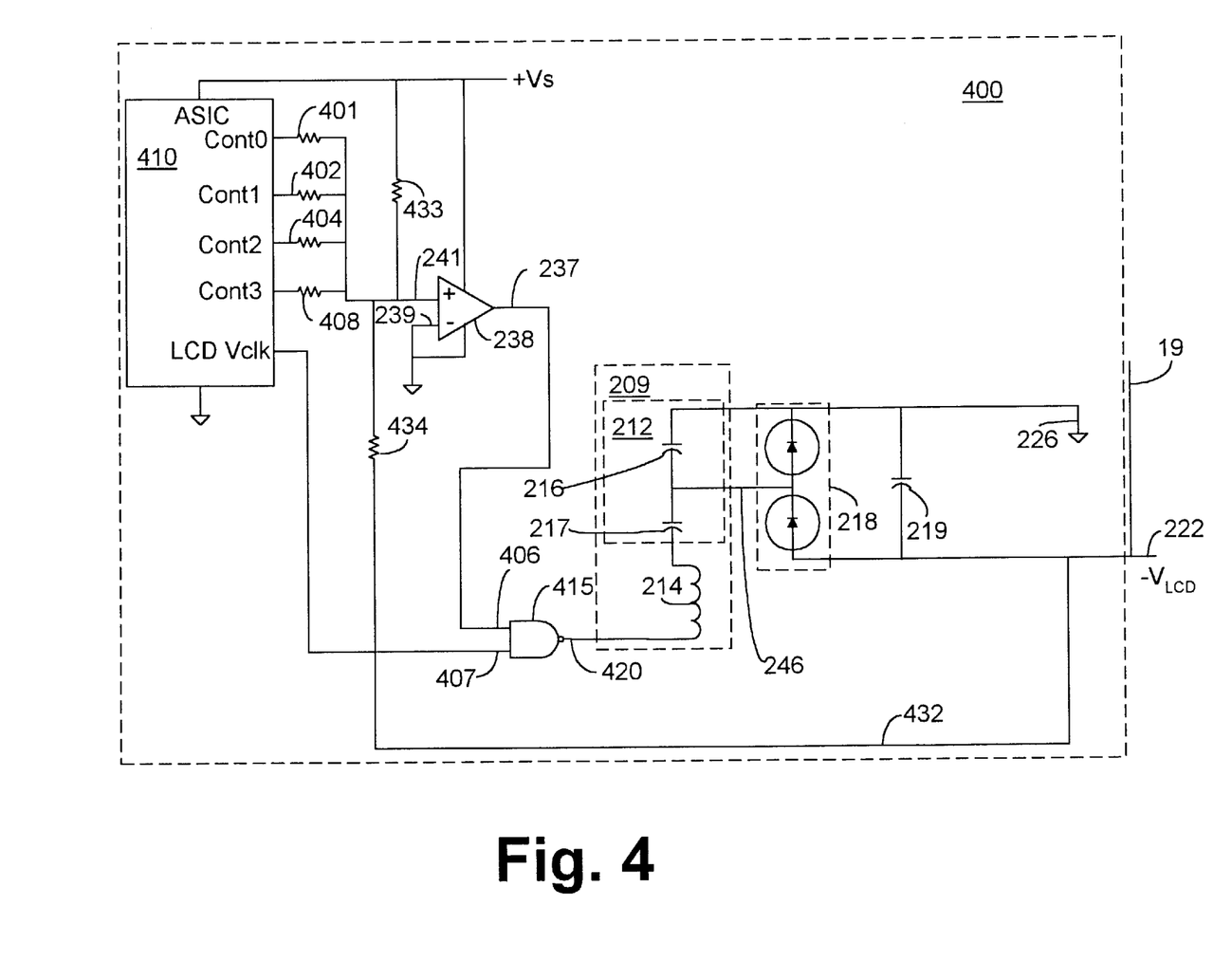
FIG. 4 is a schematic view illustrating a first alternate embodiment of the power supply of FIG. 2.

Referring now to FIG. 4, shown is a schematic view illustrating a first alternate embodiment 400 of the low power high efficiency power supply of FIG. 2. Components that perform the same function as those in FIG. 2 are like numbered and will not be discussed in detail. AND gate logic device 201 and schmitt trigger 236 are replaced by NAND gate logic device 415, which includes schmitt trigger functionality. In addition, both clock generator 202 and control voltage source 242 are replaced by ASIC 410. Because final voltage output $-V_{LCD}$ is at a negative value in this embodiment, the feedback signal on line 432 through resistor 434 is summed with the control voltage at resistors 401, 402, 404, 408, and 433, and input to non inverting input 241 of comparator 238. The non inverting input 241 of comparator 238 functions as a summing node for control currents and feedback currents. In this embodiment, inverting input 239 of comparator 238 is connected to system ground. Inverting input 239 could be connected to any other DC voltage provided that resistor values 401, 402, 404, 408, 433, and 434 are chosen to correct this offset.

In order for control loop 432 to be balanced, the inputs to comparator 238 should be at an identical voltage, which in this embodiment is zero volts. For this to be possible, the currents flowing into summing node 241 from +Vs should be removed by resistor 434.

The current from +Vs through resistor 433 sets the minimum value of $-V_{LCD}$. Resistors 401, 402, 404 and 408 are connected on one side to the control outputs of ASIC 410. The state of these control outputs and the values of resistors 401, 402, 404 and 408 determine the amount of current that resistors 401, 402, 404 and 408 will provide to summing node 241, and therefore, the amount of voltage that appears at $-V_{LCD}$ node 222. Resistors 401, 410, 404 and 408 and ASIC 402 function as a simple digital-to-analog converter. Typically, the values of resistors 401, 402, 404 and 408 will be related in a binary sequence such as 1, 2, 4, 8 etc. This arrangement allows current to be summed in a binary manner; I+I/2+I/4+I/8. Furthermore, because only one input to comparator 238 is being used, any device that could switch an output based on some comparison point at its input could serve as a comparison device. For example, a digital logic device could be used. ASIC 410 also supplies to input 407 of NAND gate logic 415, the input clock signal LCD Vclk generated by ASIC 410. The signal LCD Vclk corresponds to input clock signal 202 of FIG. 2. The output of NAND gate logic device 415 on line 420 drives resonant circuit 209 as described herein with respect to FIG. 2 with the exception that in this embodiment, the voltage at node 222 is negative.

Figure 5:
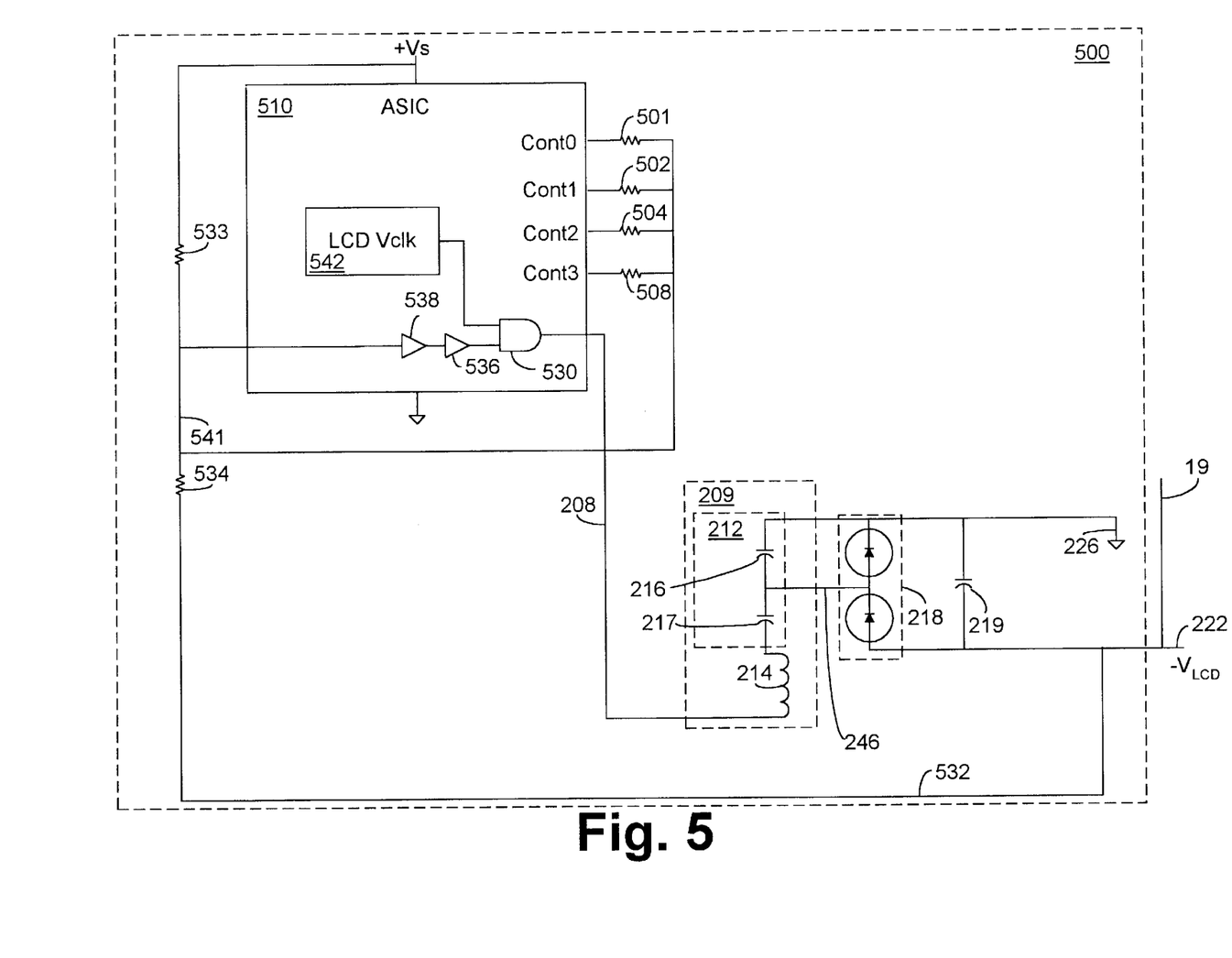
FIG. 5 is a schematic view illustrating a second alternate embodiment of the power supply of FIG. 2.

Referring now to FIG. 5, shown is a schematic view illustrating a second alternate embodiment 500 of the low power high efficiency power supply of FIG. 2. Components that perform the same function as those in FIG. 2 are like numbered and will not be discussed in detail. ASIC 510 depicts a purely digital implementation of comparator 538, schmitt trigger 536, and AND gate logic 501. When the voltage at the junction of resistors 533 and 534 at point 541 is above a digital threshold, AND gate logic 501 will allow LCD Vclk 542 (the LCD clock signal supplied by ASIC 510) to stimulate resonant circuit 209 via connection 208. When the voltage at point 541 is below a digital threshold, the signal LCD Vclk 542 supplied to resonant circuit 209 is interrupted. This embodiment uses the threshold characteristics of digital buffer 538 as the comparison device for the net voltage at point 541 (i.e., the summing node). Schmitt trigger 536 is also depicted as a discrete device, however all components contained within ASIC 510 are digitally implemented in this embodiment.

Figure 6:
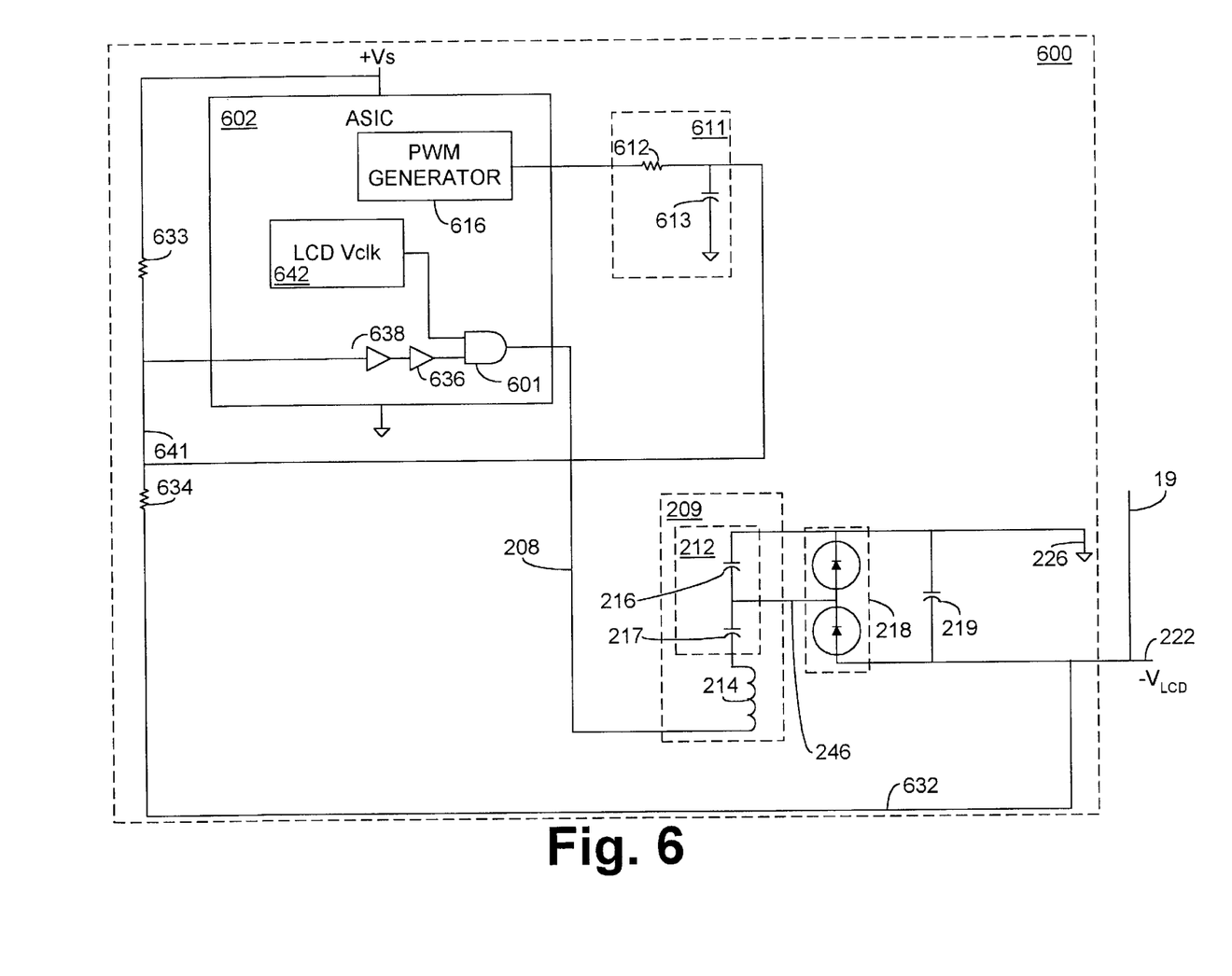
FIG. 6 is a schematic view illustrating a third alternate embodiment of the power supply of FIG. 2.

Referring now to FIG. 6, shown is a schematic view illustrating a third alternate embodiment 600 of the low power high efficiency power supply of FIG. 2. This embodiment is similar to that disclosed with respect to FIG. 5, however, control resistors 501, 502, 504 and 508 are replaced by low pass filter 611. Low pass filter 611 comprises resistor 612 and capacitor 613. Low pass filter 611 converts a high frequency pulse width modulated (PWM) digital signal, supplied by PWM generator 616, into a control voltage, which is supplied to point 641. The operation of the remaining circuitry is similar to that of FIG. 5.

It will be obvious to those skilled in the art that many modifications and variations may be made to the preferred embodiments of the present invention, as set forth above, without departing substantially from the principles of the present invention. For example, the low power high efficiency power supply can be implemented using NAND gate logic instead of AND gate logic. Also, the output of the power supply can be either a positive or negative voltage depending upon the application in which used. Furthermore, the power supply of the present invention can be implemented on an application specific integrated circuit (ASIC) instead of as discrete components as illustrated above, thereby significantly reducing the number of components required in the power supply. All such modifications and variations are intended to be included herein within the scope of the present invention, as defined in the claims that follow.

Therefore, the following is claimed:

1. A low power, high efficiency power supply, comprising:
   a comparator;
   logic, responsive to an output of said comparator and a clock signal;
   a resonant circuit having a resonant frequency, said resonant circuit configured to receive an output of said logic, said resonant circuit output being at a frequency closely matched to that of the resonant frequency of said resonant circuit; and
   a rectifier circuit configured to receive an output of said resonant circuit and provide a rectified output.

2. The power supply of claim 1, wherein said comparator is responsive, at a first input, to a control voltage, and is responsive, at a second input, to a signal proportional to that of said rectified output.

3. The power supply of claim 1, wherein said comparator is responsive to a voltage signal that is the sum of a control voltage and a signal proportional to that of said rectified output.

4. The power supply of claim 1, wherein said clock signal is closely matched to the resonant frequency of said resonant circuit.

5. The power supply of claim 1, wherein the output of said comparator functions to drive the output of said logic.

6. The power supply of claim 1, wherein said rectified output is used to drive a liquid crystal display.

7. A method for providing a low power high efficiency voltage source, comprising the steps of:

supplying to a logic gate an output of a comparator;

supplying to said logic gate a clock signal input;

supplying to a resonant circuit an output of said logic gate, said output of said logic gate having a frequency closely matched to that of said resonant circuit; and supplying to a rectifier circuit the output of said resonant circuit, said rectifier circuit supplying as output a rectified voltage signal output.

8. The method of claim 7, further comprising the steps of:

supplying to a first input of said comparator a control voltage; and supplying to a second input of said comparator a signal proportional to that of said rectified voltage signal output.

9. The method of claim 7, further comprising the step of:

supplying to said comparator a voltage signal that is the sum of a control voltage and a signal proportional to that of said rectified voltage signal output.

10. The method of claim 7, wherein said clock signal input is closely matched to the resonant frequency of said resonant circuit.

11. The method of claim 7, wherein the output of said comparator functions to drive the output of said logic gate.

12. The method of claim 7, wherein said rectified voltage signal output is used to drive a liquid crystal display.

13. A low power high efficiency voltage source, comprising:

means for supplying to a logic gate an output of a comparator;

means for supplying to said logic gate a clock signal input;

means for supplying to a resonant circuit an output of said logic gate, said output of said logic gate having a resonant frequency closely matched to that of said resonant circuit; and means for supplying to a rectifier circuit the output of said resonant circuit, said rectifier circuit supplying as output, a rectified voltage signal output.

14. The power supply of claim 13, further comprising:

means for supplying to a first input of said comparator a control voltage; and means for supplying to a second input of said comparator a signal proportional to that of said rectified voltage signal output.

15. The power supply of claim 13, further comprising:

means for supplying to said comparator a voltage signal that is the sum of a control voltage and a signal proportional to that of said rectified voltage signal output.

16. The power supply of claim 13, wherein said clock signal input is closely matched to the resonant frequency of said resonant circuit.

17. The power supply of claim 13, wherein the output of said comparator functions to drive the output of said logic gate.

18. The power supply of claim 13, wherein said rectified voltage signal output is used to drive a liquid crystal display.

* * * * *